United States Patent
Cheng et al.

(10) Patent No.: US 12,047,319 B2
(45) Date of Patent: Jul. 23, 2024

(54) INFORMATION TRANSMISSION APPARATUS, METHOD, AND SYSTEM

(71) Applicant: HUAWEI TECHNOLOGIES CO., LTD., Guangdong (CN)

(72) Inventors: Yan Cheng, Beijing (CN); Lixia Xue, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 1094 days.

(21) Appl. No.: 16/883,066

(22) Filed: May 26, 2020

(65) Prior Publication Data
US 2020/0295900 A1 Sep. 17, 2020

Related U.S. Application Data

(63) Continuation of application No. 15/921,483, filed on Mar. 14, 2018, now Pat. No. 10,680,775, which is a (Continued)

(51) Int. Cl.
*H04L 5/00* (2006.01)
*H04L 1/1829* (2023.01)
(Continued)

(52) U.S. Cl.
CPC .......... *H04L 5/0051* (2013.01); *H04L 1/1854* (2013.01); *H04L 1/1887* (2013.01);
(Continued)

(58) Field of Classification Search
CPC ... H04L 5/0051; H04L 1/1854; H04L 1/1887; H04L 5/0044; H04L 5/0053; H04L 5/1469

See application file for complete search history.

(56) References Cited

U.S. PATENT DOCUMENTS

| 2010/0278109 A1 | 11/2010 | Papasakellariou et al. |
| 2012/0093040 A1 | 4/2012 | Wu et al. |

(Continued)

FOREIGN PATENT DOCUMENTS

| CN | 1536793 A | 10/2004 |
| CN | 101309132 A | 11/2008 |

(Continued)

OTHER PUBLICATIONS

International Search Report and Written Opinion of PCT Application No. PCT/CN2015/089600 dated May 30, 2016, 9 pages.

(Continued)

*Primary Examiner* — Ronald B Abelson
(74) *Attorney, Agent, or Firm* — WOMBLE BOND DICKINSON (US) LLP

(57) ABSTRACT

This disclosure relates to the field of wireless communications technologies, and in particular, to an information transmission apparatus, method, and system. In a communications apparatus provided in an embodiment, a processing module is configured to determine a frame structure of a serving cell. In the determined frame structure, one radio frame includes at least one first subframe. The first subframe includes: a first part that includes a symbol used for downlink transmission; a second part that includes a guard period GP; and a third part that includes a symbol used for uplink transmission, and the uplink transmission includes uplink control information transmission; and a transceiver module is configured to send and receive information in the serving cell. The third part is used for uplink control information transmission.

13 Claims, 6 Drawing Sheets

Related U.S. Application Data continuation of application No. PCT/CN2015/089600, filed on Sep. 15, 2015.

(51) Int. Cl.
*H04L 1/1867* (2023.01)
*H04L 5/14* (2006.01)

(52) U.S. Cl.
CPC .......... *H04L 5/0044* (2013.01); *H04L 5/0053* (2013.01); *H04L 5/1469* (2013.01)

(56) References Cited

U.S. PATENT DOCUMENTS

| | | |
|---|---|---|
| 2015/0030005 A1 | 1/2015 | Sambhwani et al. |
| 2015/0215745 A1 | 7/2015 | Lee |
| 2017/0041119 A1 | 2/2017 | Ang et al. |

FOREIGN PATENT DOCUMENTS

| | | |
|---|---|---|
| CN | 101925110 A | 12/2010 |
| CN | 102111886 A | 6/2011 |
| CN | 102651678 A | 8/2012 |
| CN | 102752089 A | 10/2012 |
| CN | 103716143 A | 4/2014 |
| CN | 104067681 A | 9/2014 |
| EP | 3276864 A1 | 1/2018 |
| WO | 2017027300 A1 | 2/2017 |

OTHER PUBLICATIONS

Tiedemann et al. "5G: The Next Generation (Big wave) of Wireless." QUALCOMM, dated Jul. 22, 2015, 17 pages.
3GPP TSG RAN WG1 Meeting #82:"UL framework for LAA",R1-154048,ZTE, Beijing, China, Aug. 24-28, 2015, total 6 pages.

Uplink: downlink
(UL: DL) 5:5

▨▨ ▦▦ First subframe

▨▨ Used for downlink transmission, where D represents downlink
▦▦ Used for uplink transmission, where U represents uplink
☐ GP ▨▨ ▦▦ First subframe ▨▨ Used for downlink transmission, where D represents downlink
▦▦ Used for uplink transmission, where U represents uplink
☐ GP

INFORMATION TRANSMISSION APPARATUS, METHOD, AND SYSTEM

CROSS-REFERENCE TO RELATED APPLICATION

This application is a continuation of U.S. patent application Ser. No. 15/921,483, filed on Mar. 14, 2018, which is a continuation of International Application No. PCT/CN2015/089600, filed on Sep. 15, 2015, the disclosure of which is hereby incorporated by reference in its entirety.

TECHNICAL FIELD

The present invention relates to the field of wireless communications technologies, and in particular, to an information transmission apparatus, method, and system.

BACKGROUND

A current Long Term Evolution (LTE) system includes two types of frame structures. A frame structure type 1 (as shown in FIG. 1) is applied to a frequency division duplex (FDD) LTE system, and may be referred to as an "FDD frame structure." A frame structure type 2 (as shown in FIG. 2) is applied to a time division duplex (TDD) LTE system, and may be referred to as a "TDD frame structure."

Each subframe in the frame structure type 1 and that in the frame structure type 2 both have a length of 1 ms. Currently, as shown in table 1, seven uplink-downlink configurations exist in the TDD LTE system.

TABLE 1

Current uplink-downlink configurations in the TDD LTE system

| Uplink-downlink configuration | Downlink-to-uplink switch-point periodicity (Downlink-to-Uplink Switch-point periodicity) | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In an LTE system, to support hybrid automatic repeat, user equipment (UE) needs to feedback, to a base station by using a physical uplink control channel (PUCCH) and a physical uplink shared channel (PUSCH), a hybrid automatic repeat request-acknowledgement (HARQ-ACK) of a physical downlink shared channel transmission. The hybrid automatic repeat request-acknowledgement may also be referred to as an ACK (Acknowledgment)/a NACK (Negative Acknowledgement) for short. The UE needs to use a physical hybrid automatic repeat request indicator channel (PHICH) to receive a HARQ-ACK corresponding to the PUSCH.

Currently, for the FDD LTE system, a HARQ-ACK corresponding to a PDSCH transmitted in a downlink subframe n-4 is fed back in an uplink subframe n. For the TDD LTE system, a HARQ-ACK corresponding to a PDSCH transmitted in a downlink subframe n-k is fed back in an uplink subframe n. Herein, k belongs to a set K. A definition of K for each TDD uplink-downlink configuration is shown in table 2.

TABLE 2

TDD system downlink association set K: $\{k_0, k_1, L\ k_{M-1}\}$

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

For the TDD LTE system, a HARQ-ACK can be fed back in an uplink subframe. Table 2 may illustrate that any value of k is greater than or equal to 4, that is, a HARQ-ACK can be fed back after at least four subframes. As a result, a HARQ round trip time (RTT) is relatively long, and a data transmission delay is relatively long.

In conclusion, in the current TDD LTE system, uplink control information such as a HARQ-ACK is not fed back in a timely manner, causing a long data transmission delay. Consequently, the TDD LTE system cannot effectively provide a low delay service.

SUMMARY

In view of this, an information transmission apparatus, method, and system are provided, so as to resolve a problem that a data transmission delay is relatively long because uplink control information is not fed back in a timely manner.

According to a first aspect, an embodiment of the present invention provides a communications apparatus, and the apparatus includes: a processing module, configured to determine a frame structure of a serving cell, where in the determined frame structure of the serving cell, one radio frame includes at least one first subframe, and the first subframe includes the following three parts: a first part including a symbol used for downlink transmission, a second part including a guard period GP, and a third part including a symbol used for uplink transmission, where the uplink transmission includes uplink control information transmission, and a transceiver module, configured to send and receive information in the serving cell according to the frame structure, determined by the processing module, of the serving cell.

With reference to the first aspect, in a first possible implementation, the first subframe further includes a fourth part including a symbol used for downlink transmission or uplink transmission.

With reference to the first possible implementation of the first aspect, in a second possible implementation, the first part is used for downlink control transmission, the third part is used for uplink one or more of control information transmission and sounding reference signal SRS transmission, and the fourth part is used for downlink data transmission or a symbol used for uplink data transmission.

With reference to the second possible implementation of the first aspect, in a third possible implementation, the first part includes one symbol, a length of the guard period GP is equal to a length of one symbol, the third part includes one symbol, and the fourth part includes eleven symbols.

With reference to the second or the third possible implementation of the first aspect, in a fourth possible implementation, the fourth part is located in a tail of the first subframe.

With reference to the first possible implementation of the first aspect, in a fifth possible implementation, the first part is used for downlink control transmission and downlink data transmission, the third part is used for one or more of uplink control information transmission and sounding signal SRS transmission, and the fourth part is used for downlink data transmission or uplink data transmission.

With reference to the fifth possible implementation of the first aspect, in a sixth possible implementation, the first part includes seven symbols, a length of the guard period GP is equal to the length of one symbol, the third part includes one symbol, and the fourth part includes five symbols, or the first part includes eight symbols, a length of the guard period GP is equal to the length of one symbol, the third part includes one symbol, and the fourth part includes four symbols.

With reference to the first possible implementation of the first aspect, in a seventh possible implementation, the first part is used for downlink control transmission and downlink data transmission, the third part is used for one or more of uplink control information transmission and sounding signal SRS transmission; and the fourth part is specifically a symbol used for downlink control transmission and downlink data transmission, or is used for uplink data transmission.

With reference to the seventh possible implementation of the first aspect, in an eighth possible implementation, the first part includes five symbols, a length of the guard period GP is equal to a length of one symbol, the third part includes one symbol, and the fourth part includes five symbols.

With reference to any one of the fifth to the eighth possible implementations of the first aspect, in a ninth possible implementation, the fourth part is located in a tail of the first subframe, or the third part is located in a tail of the first subframe.

With reference to any one of the first to the ninth possible implementations of the first aspect, in a tenth possible implementation, the apparatus is located in a terminal device, and the processing module is specifically configured to: if uplink grant information corresponding to the fourth part is detected, determine that the fourth part is a symbol used for uplink transmission, or if uplink grant information corresponding to the fourth part is not detected, determine that the fourth part is a symbol used for downlink transmission.

According to a second aspect, an embodiment of the present invention provides a communications device, and the communications device includes the apparatus provided in the first aspect.

According to a third aspect, an embodiment of the present invention provides a communications device, and the communications device includes the apparatus provided in any one of the first to the ninth possible implementations of the first aspect.

With reference to the third aspect, in a first embodiment, the communications device is a terminal device, and the processing module is specifically configured to: if uplink grant information corresponding to the fourth part is detected, determine that the fourth part is a symbol used for uplink transmission, or if uplink grant information corresponding to the fourth part is not detected, determine that the fourth part is a symbol used for downlink transmission.

According to a fourth aspect, an embodiment of the present invention provides an information sending and receiving method, and the method includes determining, by a communications device, a frame structure of a serving cell, where in the determined frame structure of the serving cell, one radio frame includes at least one first subframe, and the first subframe includes the following three parts: a first part including a symbol used for downlink transmission, a second part including a guard period GP, and a third part including a symbol used for uplink transmission, where the uplink transmission includes uplink control information transmission, and sending and receiving, by the communications device, information in the serving cell according to the determined frame structure of the serving cell.

With reference to the fourth aspect, in a first possible implementation, the first subframe further includes a fourth part including a symbol used for downlink transmission or uplink transmission.

With reference to the first possible implementation of the fourth aspect, in a second possible implementation, the first part is used for downlink control transmission, the third part is used for one or more of uplink control information transmission and sounding reference signal SRS transmission, and the fourth part is used for downlink data transmission or a symbol used for uplink data transmission.

With reference to the second possible implementation of the fourth aspect, in a third possible implementation, the first part includes one symbol, a length of the guard period GP is equal to the length of one symbol, the third part includes one symbol, and the fourth part includes eleven symbols.

With reference to the second or the third possible implementation of the fourth aspect, in a fourth possible implementation, the fourth part is located in a tail of the first subframe.

With reference to the first possible implementation of the fourth aspect, in a fifth possible implementation, the first part is used for downlink control transmission and downlink data transmission, the third part is used for one or more of uplink control information transmission and sounding signal SRS transmission, and the fourth part is used for downlink data transmission or a symbol used for uplink data transmission.

With reference to the fifth possible implementation of the fourth aspect, in a sixth possible implementation, the first part includes seven symbols, a length of the guard period GP is equal to the length of one symbol, the third part includes one symbol, and the fourth part includes five symbols, or the first part includes eight symbols, a length of the guard period GP is to the length of one symbol, the third part includes one symbol, and the fourth part includes four symbols.

With reference to the first possible implementation of the fourth aspect, in a seventh possible implementation, the first part is used for one or more of downlink control transmission and downlink data transmission, the third part is used for one or more of uplink control information transmission and sounding signal SRS transmission, and the fourth part is used for downlink control transmission and downlink data transmission, or is used for uplink data transmission.

With reference to the seventh possible implementation of the fourth aspect, in an eighth possible implementation, the first part includes five symbols, a length of the guard period GP is equal to the length of one symbol, the third part includes one symbol, and the fourth part includes five symbols.

With reference to any one of the fifth to the eighth possible implementations of the fourth aspect, in a ninth possible implementation, the fourth part is located in a tail of the first subframe, or the third part is located in a tail of the first subframe.

With reference to any one of the first to the ninth possible implementations of the fourth aspect, in a tenth possible implementation, the communications device is a terminal device, and the determining, by a communications device, a frame structure of a serving cell includes if the communications device detects uplink grant information corresponding to the fourth part, determining that the fourth part is a symbol used for uplink transmission, or if the communications device does not detect uplink grant information corresponding to the fourth part, determining that the fourth part is a symbol used for downlink transmission.

The first subframe including the third part that is used for uplink control information transmission is introduced into a TDD frame structure, so that uplink control information can also be fed back in a subframe used for downlink transmission in the system. Therefore, the problem that a data transmission delay is relatively long because uplink control information is not fed back in a timely manner can be resolved, so as to reduce a user plane delay. In addition, because uplink control information can be quickly fed back, scheduling can be performed in a system in a timely manner according to the feedback uplink control information, and spectrum efficiency of the system is improved.

When the uplink control information is a HARQ-ACK, because the HARQ-ACK can also be fed back in the subframe used for downlink transmission, a HARQ RTT delay is reduced, and the user plane delay is reduced. In addition, because the HARQ-ACK can be quickly fed back, a scheduling algorithm can be adjusted in the system according to the feedback HARQ-ACK. Therefore, spectrum efficiency is improved.

In addition, in a current TDD system such as a TDD LTE system, in different uplink-downlink configurations, a quantity and locations of uplink subframes are inconsistent with a quantity and locations of downlink subframes. Therefore, each uplink-downlink configuration corresponds to a value of k, that is, timing for feeding back a HARQ-ACK in the current TDD system is not unified. Consequently, implementation complexity and standardization complexity are relatively high.

Therefore, when the uplink control information is the HARQ-ACK, the first subframe may be used to feed back the HARQ-ACK as well being used for downlink transmission, so that different uplink-downlink configurations may correspond to same HARQ-ACK timing. The problem that implementation complexity and standardization complexity are relatively high because HARQ-ACK timing in the current TDD system is not unified, is resolved.

Further, the first subframe may further include the fourth part. The fourth part is a symbol used for downlink transmission or a symbol used for uplink transmission.

The fourth part may be dynamically configured as a symbol used for downlink transmission or a symbol used for uplink transmission, or may be half-statically configured as a symbol used for downlink transmission or a symbol used for uplink transmission. It should be noted that when the first subframe includes the fourth part, and the fourth part is a symbol used for uplink transmission, the third part in the first subframe may be a symbol used for only uplink control information transmission.

The first subframe is introduced to perform short transmission time interval (TTI) data transmission in the first part and/or the fourth part of the first subframe. The short TTI data transmission can reduce a user plane delay. Therefore, a low delay service can be provided by introducing the first subframe. That is, the fourth part may change dynamically, so that a service delay can be reduced without limiting an uplink-downlink configuration.

DESCRIPTION OF EMBODIMENTS

Figure 1:
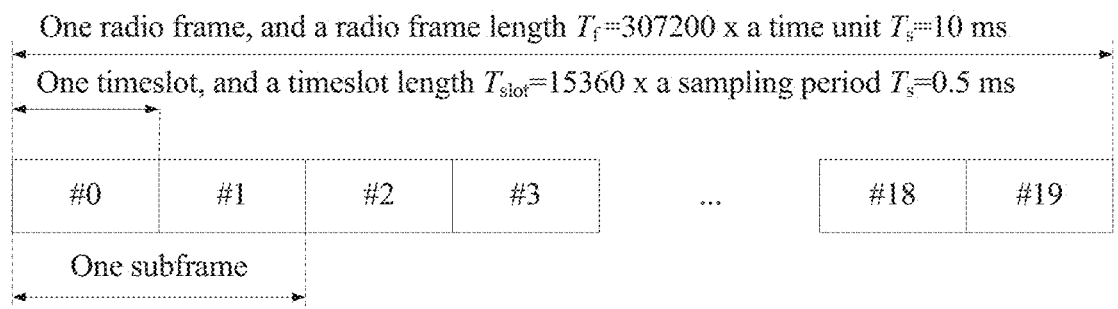
FIG. 1 and FIG. 2 are separately schematic diagrams of two types of frame structures included in a current LTE system.
Figure 2:
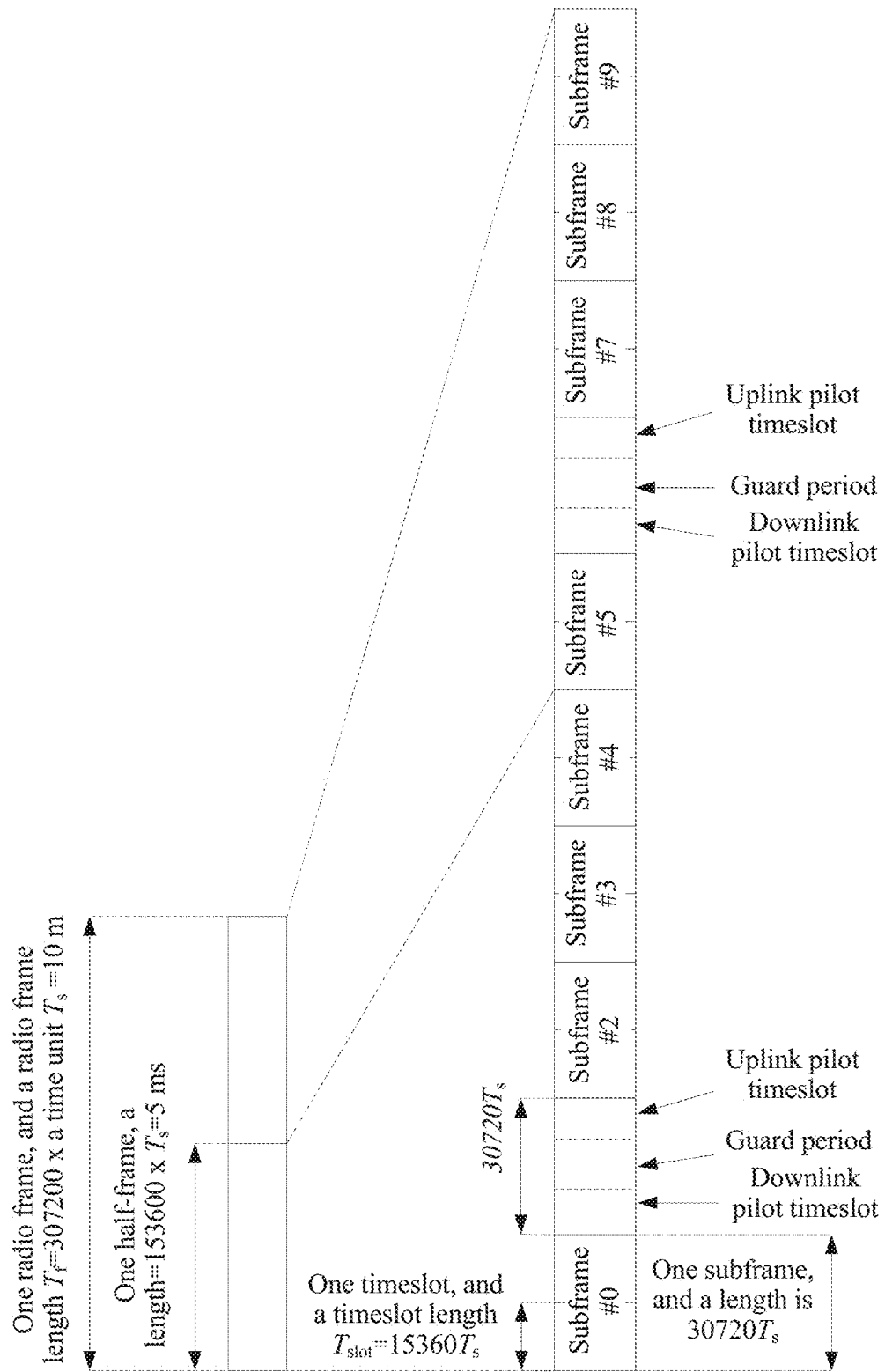

An information transmission apparatus, method, and system are provided, to resolve a problem that a data transmission delay is relatively long because uplink control information is not fed back in a timely manner.

A communications device determines a frame structure of a serving cell, and sends and receives information in the serving cell according to the determined frame structure of the serving cell.

In the determined frame structure of the serving cell, one radio frame includes at least one first subframe, and the first subframe includes the following three parts: a first part including a symbol used for downlink transmission, a second part including a guard period (GP), and a third part including a symbol used for uplink transmission, where the uplink transmission may include uplink control information transmission.

A first subframe including a third part used for uplink control information transmission is introduced into a TDD frame structure, so that uplink control information can also be fed back in a subframe used for downlink transmission in the system. Therefore, the problem that a data transmission delay is relatively long because uplink control information is not fed back in a timely manner can be resolved, so as to reduce a user plane delay. In addition, because uplink control information can be quickly fed back, scheduling can be performed in a system in a timely manner according to the feedback uplink control information, and spectrum efficiency of the system is improved.

When the uplink control information is a HARQ-ACK, because the HARQ-ACK can also be fed back in the subframe used for downlink transmission, a HARQ RTT delay is reduced, and the user plane delay is reduced. In addition, because the HARQ-ACK can be quickly fed back, a scheduling algorithm can be adjusted in the system according to the feedback HARQ-ACK. Therefore, spectrum efficiency is improved.

In addition, in a current TDD system such as a TDD LTE system, in different uplink-downlink configurations, a quantity and locations of uplink subframes are inconsistent with a quantity and locations of downlink subframes. Therefore, each uplink-downlink configuration corresponds to a value of k, that is, timing for feeding back a HARQ-ACK in the current TDD system is not unified. Consequently, implementation complexity and standardization complexity are relatively high.

Therefore, when the uplink control information is the HARQ-ACK, the first subframe may be used to feed back the HARQ-ACK as well as mainly used for downlink transmission, so that different uplink-downlink configurations may be corresponding to same HARQ-ACK timing. A problem that implementation complexity and standardization complexity are relatively high because HARQ-ACK timing in the current TDD system is not unified is resolved.

Further, the first subframe may further include a fourth part. The fourth part is a symbol used for downlink transmission or a symbol used for uplink transmission.

The fourth part may be dynamically configured as a symbol used for downlink transmission or a symbol used for uplink transmission, or may be half-statically configured as a symbol used for downlink transmission or a symbol used for uplink transmission. It should be noted that when the first subframe includes the fourth part, and the fourth part is a symbol used for uplink transmission, the third part in the first subframe may be a symbol used for only uplink control information transmission.

The first subframe is introduced to perform short transmission time interval (TTI) data transmission in the first part and/or the fourth part of the first subframe. The short TTI data transmission can reduce a user plane delay. Therefore, a low delay service can be provided by introducing the first subframe. That is, the fourth part may change dynamically, so that a service delay can be reduced without limiting an uplink-downlink configuration. Implementation is more flexible.

The following provides description in detail with reference to accompanying drawings.

Figure 3:
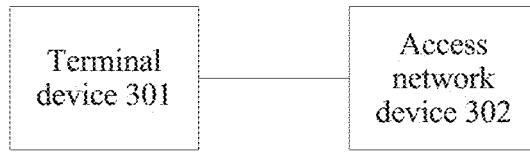
FIG. 3 is a schematic structural diagram of a wireless communications system according to an embodiment of the present invention.

FIG. 3 shows a wireless communications system provided in an embodiment. As shown in FIG. 3, the wireless communications system includes a terminal device 301 and an access network device 302.

The terminal device 301 and the access network device 302 are configured to determine a frame structure of a serving cell, and send and receive information in the serving cell according to the determined frame structure of the serving cell.

In the determined frame structure of the serving cell, one radio frame includes at least one first subframe, and the first subframe includes the following three parts: a first part including a symbol used for downlink transmission, a second part including a guard period GP, and a third part including a symbol used for uplink transmission. The uplink transmission may include uplink control information transmission.

In one embodiment, the first subframe may further include a fourth part. The fourth part is used for downlink transmission or uplink transmission.

It should be noted that when the first subframe includes the fourth part, and the fourth part is used for uplink transmission, the third part in the first subframe may be used for only uplink control information transmission.

The wireless communications system shown in FIG. 3 includes but is not limited to various wireless communications systems using a TDD duplex manner, for example, a Time Division-Synchronous Code Division Multiple Access (TD-SCDMA) system, a TDD LTE system, and various evolved wireless communications systems using the TDD duplex manner in the future.

The wireless communications system shown in FIG. 3 may be a single-carrier wireless communications system. The terminal device 301 may be configured for one carrier. The terminal device 301 performs information transmission by using one carrier at a time. Alternatively, the wireless communications system shown in FIG. 3 may be a multi-carrier wireless communications system. The terminal device 301 may be configured for multiple carriers, and the terminal device 301 may perform information transmission by using multiple carriers at a time.

In the wireless communications system shown in FIG. 3, the terminal device 301 may be a wireless terminal. The wireless terminal may be a device that provides voice and/or data connectivity for a user, a handheld device with a wireless connection function, or another processing device connected to a wireless modem. The wireless terminal may communicate with one or more core networks by using a radio access network (for example, RAN, Radio Access Network). The wireless terminal may be a mobile terminal such as a mobile phone (also referred to as a "cellular" phone), or a computer with a mobile terminal. For example, the wireless terminal may be a portable, pocket-sized, handheld computer or an in-vehicle mobile apparatus that exchanges voice and/or data with the radio access network. In another example, the wireless terminal may be a device such as a personal communications service (PCS) phone, a cordless phone, a Session Initiation Protocol (SIP) phone, a wireless local loop (WLL) station, or a personal digital assistant (PDA). The wireless terminal may also be referred to as a subscriber unit, a subscriber station, a mobile station, a mobile, a remote station, an access point, a remote terminal, an access terminal, a user terminal, a user agent, a user device, or user equipment.

The access network device 302 may include a base station or a radio resource management device for controlling a base station, or may include a base station and a radio resource management for controlling the base station. The base station may be a macro base station or a micro base station, such as a small cell or a pico cell. The base station may be a home base station, such as a home NodeB (HNB) or a home evolved NodeB (HeNB). The base station may include a relay node (relay) and the like.

For example, for a TDD LTE system, the access network device 302 may be an evolved NodeB (eNodeB), and the terminal device 301 may be a UE. For a TD-SCDMA system, the access network device 302 may include a NodeB and/or a radio network controller (RNC), and the terminal device 301 may be a UE.

In a future wireless communications system such as a fifth-generation (5G) mobile communications system, a radio access network and a core network may be combined. In this case, an access network device and a core network device are not distinguished from each other and may be collectively referred to as network devices. Therefore, the access network device 302 in the wireless communications system shown in FIG. 3 may also be a network device that performs radio transmission with the terminal device 301.

The serving cell may be a cell, a carrier, or a frequency band on which the terminal device 301 and the access network device 302 perform information transmission. From the perspective of a terminal device side, the serving cell may be a serving cell configured by the access network device 302 for the terminal device 301, a serving cell that serves the terminal device 301, or a serving cell accessed by the terminal device 301. From the perspective of an access network device 302 side, the serving cell may be a serving cell configured for the terminal device 301. In addition, the serving cell may be referred to as a carrier.

Information may include one or more of data, control information, or a reference signal.

Figure 4:
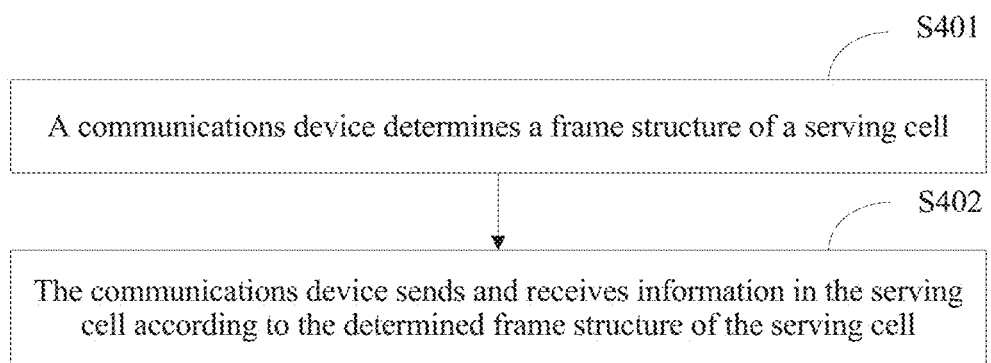
FIG. 4 is a flowchart of information transmission performed by a device in the wireless communications system shown in FIG. 3.

FIG. 4 is a flowchart in which a terminal device 301 or an access network device 302 determines a frame structure and performs information transmission in the wireless communications system shown in FIG. 3. As shown in FIG. 4, a procedure includes the following blocks:

At block S401, a communications device determines a frame structure of a serving cell.

At block S402, the communications device sends and receives information in the serving cell according to the determined frame structure of the serving cell.

In the determined frame structure of the serving cell, one radio frame includes at least one first subframe, and the first subframe includes the following three parts: a first part including a symbol used for downlink transmission, a second part including a guard period GP, and a third part including a symbol used for uplink transmission, where the uplink transmission may include uplink control information transmission.

In one embodiment, the first subframe may further include a fourth part. The fourth part is used for downlink transmission or a symbol used for uplink transmission.

It should be noted that when the first subframe includes the fourth part, and the fourth part is used for uplink transmission, the third part in the first subframe may be used for only uplink control information transmission.

In the procedure shown in FIG. 4, the communications device may be the terminal device 301 or the access network device 302.

The following separately describe block S401 and block S402 in detail.

At block S401, a communications device determines a frame structure of a serving cell.

In this block, the terminal device 301 or the access network device 302 determines the frame structure of the serving cell. In the determined frame structure of the serving cell, one radio frame includes at least one first subframe, and the first subframe includes: a first part including a symbol used for downlink transmission, a second part including a guard period GP, and a third part including a symbol used for uplink transmission. The uplink transmission may include uplink control information transmission.

In one embodiment, the first subframe may further include a fourth part. The fourth part is used for downlink transmission or a symbol used for uplink transmission.

It should be noted that when the first subframe includes the fourth part, and the fourth part is used for uplink transmission, the third part in the first subframe may be used for only uplink control information transmission.

Specifically, a subframe structure of the first subframe may include but is not limited to the following four examples:

EXAMPLE 1

The first subframe includes four parts: a first part including a symbol used for downlink control transmission, a second part including a guard period (GP), a third part including a symbol used for one or more of uplink control transmission and sounding reference signal (SRS) transmission, and a fourth part including a symbol used for downlink data transmission or uplink data transmission.

The symbol used for downlink data transmission herein may be a symbol used for physical downlink shared channel (PDSCH) transmission, or may be a symbol used for PDSCH transmission and downlink reference signal transmission. The symbol used for uplink data transmission herein may be a symbol used for physical uplink shared channel (PUSCH) transmission, or may be a symbol used for PUSCH transmission and demodulation reference signal transmission.

That is, in the first subframe, the first part is mainly used for downlink control (may include a downlink reference signal used for downlink control demodulation) transmission, the third part is used for uplink control information transmission and/or sounding reference signal SRS transmission, and the fourth part may be used for downlink data transmission or uplink data transmission.

It should be noted that in all the embodiments of the present invention, downlink control may include a physical downlink control channel PDCCH (and/or an enhanced physical downlink control channel EPDCCH) and/or a physical hybrid automatic repeat request indicator channel PHICH. The downlink control transmission may be physical downlink control channel (and/or an enhanced physical downlink control channel EPDCCH) transmission and/or physical hybrid automatic repeat request indicator channel transmission.

In example 1, the fourth part may be located in a tail of the first subframe, for example, an order of the four parts in the first subframe may be: the first part, the second part, the third part, and the fourth part.

Figure 5:
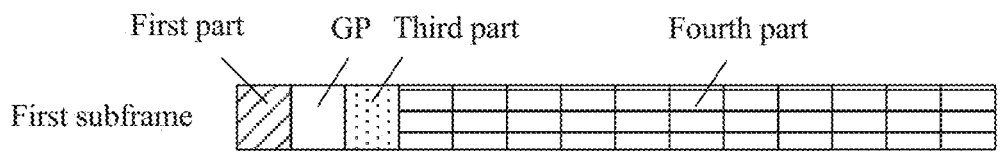
FIG. 5 is a schematic diagram of an optional subframe structure when a subframe structure of a first subframe is an example 1.

Specifically, in example 1, a quantity of symbols corresponding to each part is not limited. In some embodiments, a maximum quantity of symbols corresponding to the first part may be three, and a quantity of symbols corresponding to the third part may be one. FIG. 5 shows an example of the first subframe. A quantity of symbols included in the first part may be one, a length of the guard period GP is one symbol, a quantity of symbols included in the third part may be three, and a quantity of symbols included in the fourth part may be eleven.

EXAMPLE 2

The first subframe includes four parts: a first part including a symbol used for downlink control transmission and downlink data transmission, a second part including a guard period GP, a third part including a symbol used for one or more of uplink control information transmission and sounding signal SRS transmission, and a fourth part including a symbol used for downlink data transmission or a symbol used for uplink data transmission.

The symbol used for downlink data transmission herein may be a symbol used for PDSCH transmission, or may be a symbol used for PDSCH transmission and/or downlink reference signal transmission. The symbol used for uplink data transmission herein may be a symbol used for PUSCH transmission and a symbol used for demodulation reference signal transmission.

That is, in the first subframe, the first part is mainly used for downlink control transmission, downlink data transmission, and downlink reference signal transmission, the third part is used for uplink control information transmission and/or SRS transmission, and the fourth part may be used for downlink data transmission or uplink data transmission, that is, the fourth part is changeable.

Figure 6:
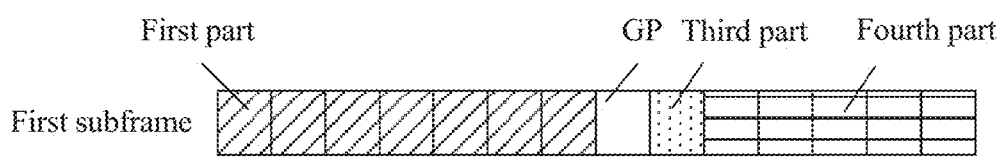
FIG. 6 is a schematic diagram of an optional subframe structure when a subframe structure of a first subframe is an example 2.

In example 2, the fourth part may be located in a tail of the first subframe, for example, an order of the four parts in the first subframe may be: the first part, the second part, the third part, and the fourth part. FIG. 6 shows an example subframe. In this order, an advantage is that a location of the second part GP remains unchanged regardless of whether the fourth part is used for downlink data transmission or uplink data transmission. Therefore, implementation complexity is reduced.

In example 2, the third part may alternatively be located in the tail of the first subframe. In this case, when the fourth part is used for downlink data transmission, an order of the fourth parts in the first subframe is: the first part, the fourth part, the second part, and the third part. When the fourth part is used for uplink data transmission, an order of the fourth parts in the first subframe is: the first part, the second part, the fourth part, and the third part. When the third part is located in the tail of the first subframe, an advantage is that when the fourth part is used for downlink transmission, if the first part and the fourth part belong to a same TTI, the first part is not separated from the fourth part by the second part and the third part. Therefore, implementation complexity is reduced, a decoding time is reduced, and decoding efficiency is improved.

Specifically, in example 2, a quantity of symbols corresponding to each part is not limited. For example, the first part may include seven symbols, a length of the guard period GP may be one symbol, the third part may include one symbol, and the fourth part may include five symbols. In this case, when a quantity of symbols that are included in the first part and that are used for downlink control transmission is two, a quantity of symbols that are included in the first part and that are used for downlink data transmission is five, and is the same as a quantity of symbols that are included in the fourth part and that are used for downlink data transmission. Therefore, each TTI provides a same resource for downlink data for use, so as to simplify a design of a size of a downlink data transport block. Alternatively, the first part may include eight symbols, a length of the guard period GP may be one symbol, the third part may include one symbol, and the fourth part may include four symbols.

In addition, in example 2, downlink control transmission is performed in only the first part, so that the first part and the fourth part share control channel resources, so as to improve spectrum efficiency of the system.

EXAMPLE 3

The first subframe includes four parts: a first part including a symbol used for downlink control transmission and downlink data transmission, a second part including a guard period GP, a third part including a symbol used for uplink control information transmission and/or SRS transmission, and a fourth part including a symbol used for downlink control transmission and downlink data transmission or a symbol used for uplink data transmission.

The symbol used for downlink data transmission herein may be a symbol used for PDSCH transmission, or may be a symbol used for PDSCH transmission and downlink reference signal transmission. Alternatively, the symbol used for downlink control transmission may be a symbol used for downlink control transmission and/or transmission of a downlink reference signal used for downlink control demodulation. The symbol used for uplink data transmission herein may be a symbol used for PUSCH transmission and a symbol used for demodulation reference signal transmission.

That is, in the first subframe, the first part is mainly used for downlink control transmission, downlink data transmission, and downlink reference signal transmission. The third part is used for uplink control information transmission and/or SRS transmission. When the fourth part is used for downlink transmission, the fourth part may be specifically used for downlink control transmission, downlink data transmission, and downlink reference signal transmission. When the fourth part is used for uplink transmission, the fourth part may also be used for uplink data transmission and demodulation reference signal transmission, that is, the fourth part is changeable.

In example 3, when the fourth part is used for downlink transmission that includes downlink control transmission, downlink data transmitted by using the fourth part may be scheduled by using the downlink control. Therefore, a data processing time can be reduced, and a user plane delay can be reduced.

Figure 7:
FIG. 7 is a schematic diagram of an optional subframe structure when a subframe structure of a first subframe is an example 3.

In example 3, the fourth part may be located in a tail of the first subframe, for example, an order of the four parts in the first subframe may be: the first part, the second part, the third part, and the fourth part. FIG. 7 shows an example subframe. In this order, an advantage is that a location of the second part GP remains unchanged regardless of whether the fourth part is used for downlink data transmission or uplink data transmission. Therefore, implementation complexity is reduced.

In example 3, the third part may alternatively be located in the tail of the first subframe. In this case, when the fourth part is used for downlink data transmission, an order of the fourth parts in the first subframe is: the first part, the fourth part, the second part, and the third part. When the fourth part is used for uplink data transmission, an order of the fourth parts in the first subframe is: the first part, the second part, the fourth part, and the third part. When the third part is located in the tail of the first subframe, an advantage is that when the fourth part is used for downlink transmission, if the first part and the fourth part belong to a same TTI, the first part is not separated from the fourth part by the second part and the third part. Therefore, implementation complexity is reduced and a decoding time is reduced.

Specifically, in example 3, a quantity of symbols corresponding to each part is not limited. For example, the first part may include five symbols, a length of the guard period GP may be one symbol, the third part may include one symbol, and the fourth part may include five symbols. In this example, the first part and the fourth part have a same quantity of symbols, so as to simplify a design of a size of a data transport block.

Example 4

The first subframe includes three parts: a first part including a symbol used for downlink control transmission and downlink data transmission, a second part including a guard period GP, and a third part including a symbol used for uplink control information transmission and/or uplink data transmission. The symbol corresponding to the third part may further be used for sounding signal SRS transmission.

The symbol used for downlink data transmission herein may be a symbol used for PDSCH transmission, or may be a symbol used for PDSCH transmission and/or downlink reference signal transmission. The symbol used for uplink data transmission herein may be a symbol used for PUSCH transmission and a symbol used for demodulation reference signal transmission.

In example 4, whether the third part is used for uplink data transmission may be dynamically configured. For example, if the terminal device 301 detects an uplink grant corresponding to the third part, the third part is used for uplink data transmission, and a subframe corresponding to the third part is the first subframe. If the terminal device 301 does not detect an uplink grant, a subframe corresponding to the third part is a downlink subframe. In this case, dynamically configuring whether the third part is used for uplink data transmission may be equivalent to dynamically configuring some downlink subframes in a radio frame as the first subframe.

In addition, in example 4, some uplink subframes in a radio frame may be dynamically configured as the first subframe. Therefore, a downlink low delay service may be provided by using the first part, and an uplink-downlink configuration is not limited.

In example 4, whether the third part of the first subframe is used for uplink data transmission is dynamically determined, some downlink subframes in a radio frame are dynamically configured as the first subframe, or some uplink subframes in a radio frame are dynamically configured as the first subframe. Therefore, uplink and downlink low delay services can be provided without limiting an uplink-downlink configuration. For example, when an uplink low delay service is required, some downlink subframes in a frame structure may be dynamically changed into downlink subframes according to uplink and downlink service volumes and a service volume of low delay services, so as to provide an uplink low delay service. In addition, a low delay service can be provided without limiting an uplink-downlink configuration of the frame structure, so as to better match real-time uplink and downlink service volumes.

Fourth examples of the subframe structure of the first subframe are described above. In the first subframe, the fourth part may be used for downlink transmission, or may be used for uplink transmission. The fourth part may be dynamically configured as a symbol used for downlink transmission or a symbol used for uplink transmission, or may be half-statically configured as a symbol used for downlink transmission or a symbol used for uplink transmission. When the fourth part dynamically changes, optionally, the terminal device 301 or the access network device 302 may determine whether the fourth part is used for uplink transmission or downlink transmission in the following manners.

Manner 1

In manner 1, for the terminal device 301, if the terminal device 301 detects an uplink grant corresponding to the fourth part, the fourth part is a symbol used for uplink transmission. If the terminal device 301 does not detect an uplink grant corresponding to the fourth part, the fourth part is a symbol used for downlink transmission.

Herein, the uplink grant corresponding to the fourth part may be a UL grant, and the uplink grant may be used to schedule uplink transmission of the fourth part.

In manner 1, for the access network device 302, if the access network device 302 sends an uplink grant corresponding to the fourth part, the fourth part is a symbol used for uplink transmission. If the access network device 302 does not send an uplink grant corresponding to the fourth part, the fourth part is a symbol used for downlink transmission.

Manner 2

In manner 2, for the terminal device 301, the terminal device 301 receives downlink control information sent by the access network device 302, and determines, according to the downlink control information, whether the fourth part of the first subframe is used for downlink transmission or uplink transmission.

For example, the downlink control information may be carried in the first part of the first subframe, and a domain in the downlink control information is used to indicate whether the fourth part is used for downlink transmission or uplink transmission. For example, when the domain is a first value (for example, 0), the fourth part is used for downlink transmission. When the domain is a second value (for example, 1), the fourth part is used for uplink transmission.

For another example, the downlink control information may be carried in a first subframe in a radio frame and the downlink control information may indicate each first subframe in the radio frame. For example, if a quantity of first subframes in one radio frame is 10, the downlink control information may include 10 bits, and each bit corresponds to one first subframe. When a bit is 0, it indicates that a fourth part of a corresponding subframe is used for downlink transmission. When a bit is 1, it indicates that the fourth part of the corresponding subframe is used for uplink transmission.

In manner 2, for the access network device 302, the access network device 302 sends downlink control information. The downlink control information indicates whether the fourth part corresponding to the first subframe is used for downlink transmission or uplink transmission.

At block S402, a terminal device 301 or an access network device 302 transmits information, that is, sends and/or receives information in the serving cell based on the frame structure determined in block S401.

In block S402, the terminal device 301 transmits information in the serving cell based on the frame structure determined in block S401. Herein, the information transmission may be all information transmission performed based on the frame structure.

For example, downlink transmission may include PDSCH transmission, physical downlink control channel (PDCCH) transmission, physical hybrid automatic repeat request indicator channel (PHICH) transmission, downlink reference signal transmission, and the like.

Uplink transmission may include PUSCH transmission, PUCCH transmission, uplink reference signal transmission, and the like. Generally, PDSCH-related transmission and the PUSCH transmission may be performed according to specific hybrid automatic repeat request timing (HARQ timing).

For example, when the first subframe in block S401 is the same as that described in example 1, for the terminal device 301, block S402 may perform the following actions:

The terminal device 301 receives downlink control in the first part of the first subframe, and sends uplink control information and/or an SRS in the third part. When the fourth part is a symbol used for downlink transmission, the terminal device 301 receives a PDSCH in the fourth part. When the fourth part is a symbol used for uplink transmission, the terminal device 301 sends a physical uplink shared channel in the fourth part.

For the access network device 302, block S402 may perform the following actions:

The access network device 302 sends downlink control in the first part of the first subframe, and receives uplink control information and/or an SRS in the third part; and when the fourth part is a symbol used for downlink transmission, the access network device 302 sends a PDSCH in the fourth part. When the fourth part is a symbol used for uplink transmission, the access network device 302 receives a physical uplink shared channel in the fourth part.

Principles of sending and receiving information by the access network device 302 and the terminal device 301 in another example of the first subframe are similar to those in example 1. Details are not described herein.

The following specifically analyzes an impact exerted on information transmission when the frame structure of the first subframe is used.

The first subframe includes a third part, and the third part is used for uplink control information transmission. Therefore, in a wireless communications system using a TDD duplex manner, a HARQ-ACK can also be fed back in a subframe used for downlink transmission (for example, the fourth part is also used for downlink transmission), so as to reduce a HARQ RTT delay, and reduce the user plane delay. In addition, because the HARQ-ACK can be quickly fed back, a scheduling algorithm can be adjusted in the system according to the feedback HARQ-ACK, so as to improve spectrum efficiency.

In addition, because of the introduction of the first subframe, the first subframe may be used to feed back a HARQ-ACK as well as mainly used for downlink transmission, so that different uplink-downlink configurations may be corresponding to same HARQ-ACK timing.

An uplink-downlink configuration 2 listed in table 1 is used as an example. In this case, a frame structure in a current TDD LTE system and a new frame structure obtained after the first subframe (Si) is introduced may be shown in FIG. 8.

Figure 8:
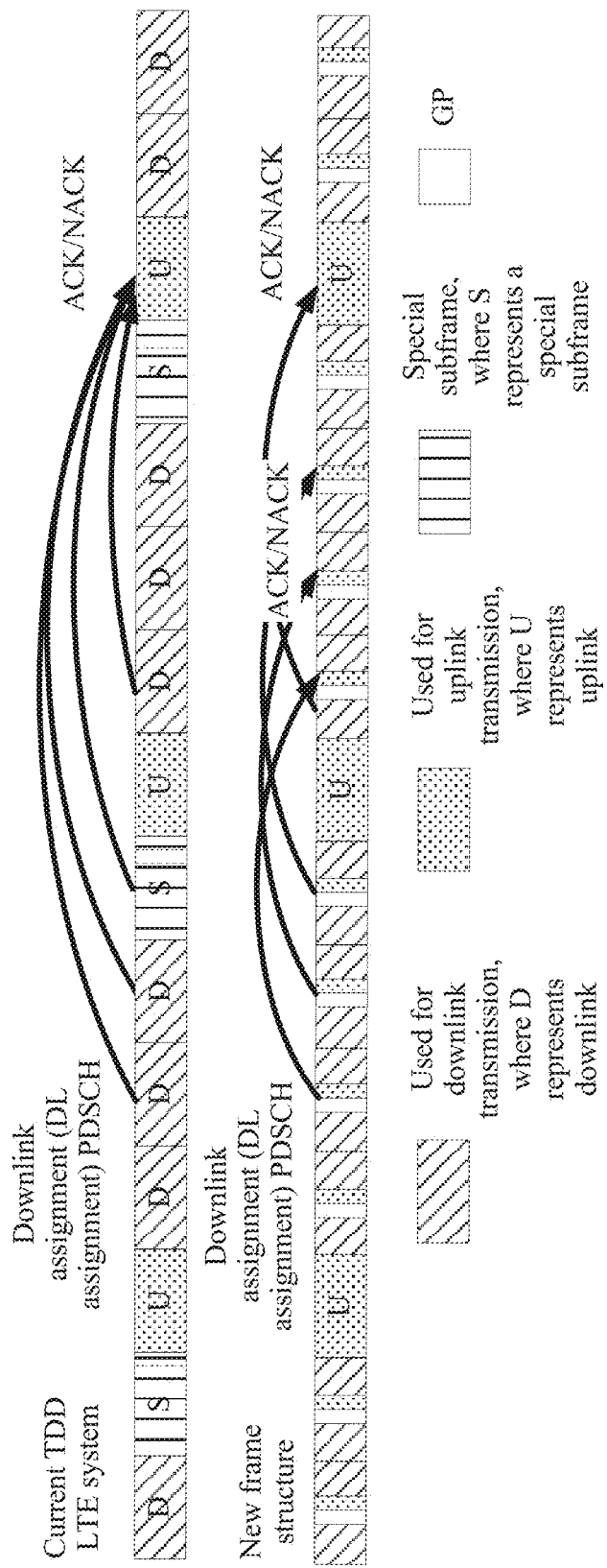
FIG. 8 is a schematic diagram of a new frame structure obtained after a first subframe is introduced into a current TDD LTE system.

It can be learned from FIG. 8 that in the new frame structure, a HARQ-ACK corresponding to a PDSCH transmitted in a subframe n may be fed back in a subframe n+4. This is similar to an FDD LTE system. However, in the current TDD LTE system, a HARQ-ACK corresponding to a PDSCH transmitted in a downlink subframe n-k is to be fed back in an uplink subframe n, where k belongs to a set K, and a definition of the set K is shown in table 2. It can be learned from table 2 that when the uplink-downlink configuration is 2, values of three elements in the set K are greater than 4. However, in the new frame structure, k values corresponding to all downlink subframes are 4. Therefore, a HARQ RTT delay is reduced when the new frame structure is used.

In addition, in the new frame structure, a subframe used for downlink transmission can also be used to feed back a HARQ-ACK. Therefore, unified HARQ-ACK timing can be used in any uplink-downlink configuration.

In addition, the first subframe is introduced to perform short transmission time interval data transmission in the first part and/or the fourth part of the first subframe. The short TTI data transmission can reduce a user plane delay. Therefore, a low delay can be provided by introducing the first subframe.

In addition, optionally, the fourth part of the first subframe may be half-statically configured for uplink transmission or downlink transmission. In this case, in order that an uplink delay and a downlink delay of a system using a TDD duplex manner can be similar to those of a system using an FDD duplex manner, a frame structure of the system using the TDD duplex manner may use a structure shown in FIG. 9 (it is assumed that a length of one TTI is a length of a half subframe).

Figure 9:
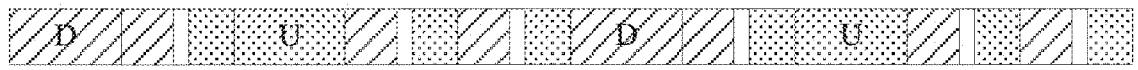
FIG. 9 is a schematic diagram of an optional frame structure of a TDD duplex manner system.

In the frame structure shown in FIG. 9, the uplink delay and the downlink delay (obtained when a HARQ RTT delay is not considered and when it is assumed that a length of one subframe is 1 ms) are shown in Table 3. The delay is more close to that in the system using the FDD duplex manner, for example, a delay of an FDD LTE system is 2 ms.

TABLE 3

A list of uplink delays and downlink delays in a frame structure shown in FIG. 9

| | Uplink:downlink (UL:DL) 5:5 | |
| --- | --- | --- |
| | Downlink (DL) | Uplink (UL) |
| Transmit processing delay (Tx Processing Delay) | 0.5 ms | 0.5 ms |
| Frame alignment (Frame Alignment) | 0.65 ms | 0.6 ms |
| TTI duration (TTI duration) | 0.5 ms | 0.5 ms |
| Receive processing delay (Rx Processing Delay) | 0.75 ms | 0.75 ms |
| User plane delay | 2.4 ms | 2.35 ms |

A low delay may be implemented by using the frame structure shown in FIG. 9. Further, in order to better match an actual uplink-downlink service ratio, optionally, whether the fourth part of the first subframe is used for uplink transmission or downlink transmission may be dynamically determined. For example, the fourth part is dynamically changed into a symbol used for downlink transmission or dynamically changed into a symbol used for uplink transmission according to uplink and downlink service volumes and a service volume of low delay services. Therefore, a low delay service can be provided without limiting an uplink-downlink configuration of the frame structure, so as to better match real-time uplink and downlink service volumes.

Figure 10:
FIG. 10 is a schematic diagram of another optional frame structure of a TDD duplex manner system.

For example, if a low delay service at a current moment comes from downlink services, the fourth part may be dynamically determined, and a frame structure of a radio frame is shown in FIG. 10. If both uplink and downlink have a low delay service requirement at a current moment, the fourth part is dynamically determined, and a frame structure of a radio frame is shown in FIG. 9.

Figure 11:
FIG. 11 is a schematic structural diagram of a communications apparatus according to an embodiment.

FIG. 11 is a schematic structural diagram of a communications apparatus according to an embodiment. As shown in FIG. 11, the communications apparatus includes a processing module 1101 and a transceiver module 1102.

The processing module 1101 is configured to determine a frame structure of a serving cell.

In the determined frame structure of the serving cell, one radio frame includes at least one first subframe, and the first subframe includes the following three parts: a first part including a symbol used for downlink transmission, a second part including a guard period GP, and a third part including a symbol used for uplink transmission, where the uplink transmission includes uplink control information transmission.

The transceiver module 1102 is configured to send and receive information in the serving cell according to the frame structure, determined by the processing module 1101, of the serving cell.

In one embodiment, the first subframe further includes: a fourth part including a symbol used for downlink transmission or a symbol used for uplink transmission.

In one embodiment, the first part is used for downlink control transmission. The third part is used for uplink control information transmission and/or sounding reference signal SRS transmission. The fourth part is specifically a symbol used for downlink data transmission or a symbol used for uplink data transmission.

In one embodiment, a quantity of symbols included in the first part is one, a length of the guard period GP is one symbol, a quantity of symbols included in the third part is one, and a quantity of symbols included in the fourth part is eleven.

In one embodiment, the fourth part is located in a tail of the first subframe.

In one embodiment, the first part is used for downlink control transmission and downlink data transmission, the third part is used for uplink control information transmission and/or sounding signal SRS transmission, and the fourth part is used for downlink data transmission or a symbol used for uplink data transmission.

In one embodiment, the first part includes seven symbols, a length of the guard period GP is one symbol, the third part includes one symbol, and the fourth part includes five symbols. Alternatively, the first part includes eight symbols, a length of the guard period GP is one symbol, the third part includes one symbol, and the fourth part includes four symbols.

In one embodiment, the first part is used for downlink control transmission and downlink data transmission, the third part is used for uplink control information transmission and/or sounding signal SRS transmission, and the fourth part is used for downlink control transmission and downlink data transmission or a symbol used for uplink data transmission.

In one embodiment, the first part includes five symbols, a length of the guard period GP is one symbol, the third part includes one symbol, and the fourth part includes five symbols.

In one embodiment, the fourth part is located in a tail of the first subframe, or the third part is located in a tail of the first subframe.

In one embodiment, the apparatus is located in a terminal device, and the processing module 1101 is specifically configured to: if uplink grant information corresponding to the fourth part is detected, determine that the fourth part is a symbol used for uplink transmission; or if uplink grant information corresponding to the fourth part is not detected, determine that the fourth part is a symbol used for downlink transmission.

A wireless communications system including the apparatus may be the wireless communications system shown in FIG. 3, and a duplex manner of the wireless communications system including the apparatus may be a TDD duplex manner, for example, a TDD LTE system, a TD-SCDMA system, various subsequent evolved wireless communications systems using the TDD duplex manner, and the like. This means that the apparatus may perform communication in the TDD duplex manner, and a communications standard may include a communications standard of any TDD wireless communications system described above.

The wireless communications system including the apparatus may be a single-carrier wireless communications system or a multi-carrier wireless communications system. This means that the apparatus may perform single-carrier communication or multi-carrier communication.

A communications device including the apparatus may be a terminal device 301 or an access network device 302. For various communication and processing manners thereof, refer to communication and processing manners of the foregoing terminal device 301 and the access network device 302.

For a procedure in which the apparatus sends and receives information, refer to

FIG. 4 and related description. The processing module 1101 may implement operations such as processing and control in the procedure, and the transceiver module 1102 may implement operations such as information transmission in the procedure.

The subframe structure, determined by the processing module 1101, of the first subframe may be any one of example 1 to example 4 in the foregoing. The processing module 1101 may also determine, in the foregoing manner 1 or manner 2, whether the fourth part is used for uplink transmission or downlink transmission.

When the apparatus performs information transmission by using the frame structure of the first subframe, for an impact exerted on the information transmission, refer to the foregoing FIG. 8 to FIG. 10, table 3, and related description. Details are not described herein again.

For another optional implementation of the apparatus, refer to the wireless communications system shown in FIG. 3 and corresponding description. Details are not described herein again.

In one embodiment, the processing module 1101 may be implemented by one or more processors. The transceiver module 1102 may be implemented by one or more transceivers, or be implemented by one or more receivers and one or more transmitters.

The processor for implementing the processing module 1101 and the transceiver for implementing the transceiver module 1102, or the receiver and the transmitter may be integrated into one chip or multiple chips.

Figure 12:
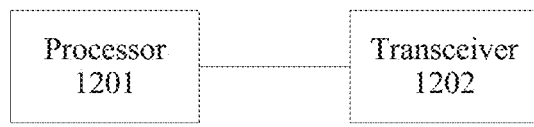
FIG. 12 is a schematic structural diagram of another communications apparatus according to an embodiment.

FIG. 12 is a schematic structural diagram of a communications apparatus according to an embodiment. As shown in FIG. 12, the communications apparatus includes a processor 1201 and a transceiver 1202.

The processor 1201 is configured to determine a frame structure of a serving cell.

In the determined frame structure of the serving cell, one radio frame includes at least one first subframe, and the first subframe includes the following three parts: a first part including a symbol used for downlink transmission, a second part including a guard period GP, and a third part including a symbol used for uplink transmission, where the uplink transmission includes uplink control information transmission.

The transceiver 1202 is configured to send and receive information in the serving cell according to the frame structure, determined by the processor 1201, of the serving cell.

For various optional implementations of the processor 1201, refer to those of the processing module 1101. For various optional implementations of the transceiver 1202, refer to those of the transceiver module 1102.

In an embodiment, a communications device is provided, and the communications device may include the apparatus shown in FIG. 11 or FIG. 12. The communications device may be a terminal device or an access network device. For various optional implementations of the communications device, refer to those of the apparatus shown in FIG. 11 or FIG. 12.

Figure 13:
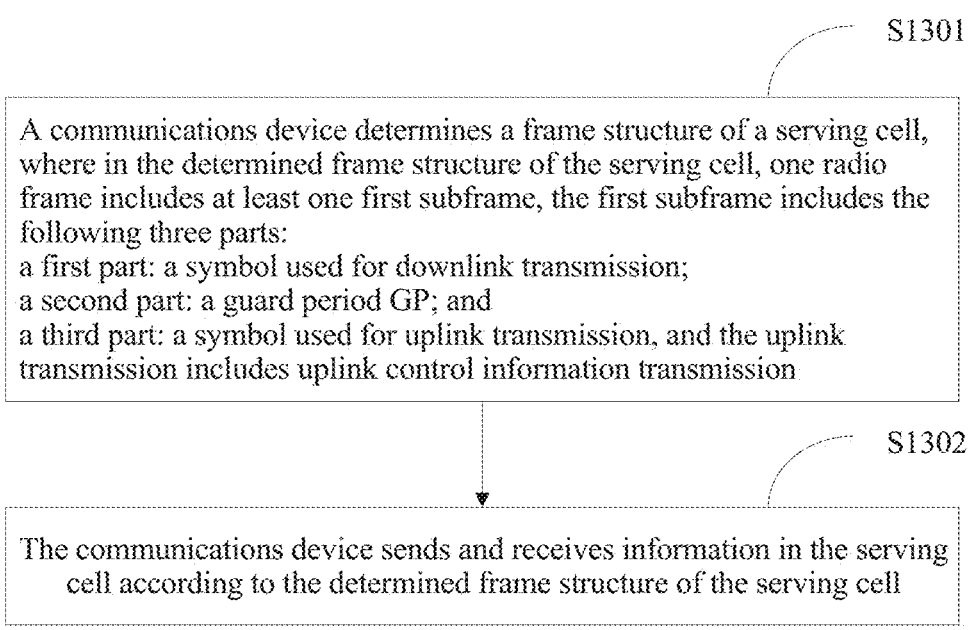
FIG. 13 is a flowchart of an information sending and receiving method according to an embodiment.

FIG. 13 is a flowchart of an information sending and receiving method according to an embodiment. As shown in FIG. 13, the method includes the following blocks.

At block S1301, a communications device determines a frame structure of a serving cell.

In the determined frame structure of the serving cell, one radio frame includes at least one first subframe, and the first subframe includes the following three parts: a first part including a symbol used for downlink transmission, a second part including a guard period GP, and a third part including a symbol used for uplink transmission, where the uplink transmission includes uplink control information transmission.

At block S1302, the communications device sends and receives information in the serving cell according to the determined frame structure of the serving cell.

In one embodiment, the first subframe further includes a fourth part including a symbol used for downlink transmission or a symbol used for uplink transmission.

In one embodiment, the first part is used for downlink control transmission, the third part is used for uplink control information transmission and/or sounding reference signal SRS transmission, and the fourth part is used for downlink data transmission or a symbol used for uplink data transmission.

In one embodiment, a quantity of symbols included in the first part is one, a length of the guard period GP is one symbol, a quantity of symbols included in the third part is one, and a quantity of symbols included in the fourth part is eleven.

In one embodiment, the fourth part is located in a tail of the first subframe.

In one embodiment, the first part is used for downlink control transmission and downlink data transmission, the third part is used for uplink control information transmission and/or sounding signal SRS transmission, and the fourth part is used for downlink data transmission or a symbol used for uplink data transmission.

In one embodiment, the first part includes seven symbols, a length of the guard period GP is one symbol, the third part includes one symbol, and the fourth part includes five symbols. Alternatively, the first part includes eight symbols, a length of the guard period GP is one symbol, the third part includes one symbol, and the fourth part includes four symbols.

In one embodiment, the first part is used for downlink control transmission and downlink data transmission, the third part is used for uplink control information transmission and/or sounding signal SRS transmission, and the fourth part is specifically a symbol used for downlink control transmission and downlink data transmission or a symbol used for uplink data transmission.

In one embodiment, the first part includes five symbols, a length of the guard period GP is one symbol, the third part includes one symbol, and the fourth part includes five symbols.

In one embodiment, the fourth part is located in a tail of the first subframe or the third part is located in a tail of the first subframe.

In one embodiment, that a communications device determines a frame structure of a serving cell in block S1301 includes: if the communications device detects uplink grant information corresponding to the fourth part, determining that the fourth part is a symbol used for uplink transmission; or if the communications device does not detect uplink grant information corresponding to the fourth part, determining that the fourth part is a symbol used for downlink transmission.

In this method, information sending and receiving may be performed in a TDD duplex manner, and a communications standard may include but is not limited to a communications standard used in a TDD LTE system, a TD-SCDMA system, various subsequent evolved wireless communications systems using the TDD duplex manner, and the like.

In this method, during information sending and receiving, communication may be performed based on a single-carrier manner or a multi-carrier manner.

In this method, the communications device may be a terminal device 301 or an access network device 302. For various communication and processing manners of the two types of communications devices, refer to communication and processing manners of the foregoing terminal device 301 and the access network device 302.

In this method, for a procedure of the information sending and receiving, refer to FIG. 4 and related description.

In this method, the subframe structure, determined in block S1301, of the first subframe may be any one of example 1 to example 4 in the foregoing. Whether the fourth part is used for uplink transmission or downlink transmission may be determined in manner 1 or manner 2 in the foregoing.

When information transmission is performed by using the frame structure of the first subframe, for an impact exerted on the information transmission, refer to the foregoing FIG. 8 to FIG. 10, table 3, and related description. Details are not described herein again.

For another optional implementation of this method, refer to processing and information transmission of the communications device in the wireless communications system shown in FIG. 3. Details are not described herein again.

In conclusion, the first subframe including the third part used for uplink control information transmission is introduced into a TDD frame structure, so that uplink control information can also be fed back in a subframe used for downlink transmission in the system. Therefore, the problem that a data transmission delay is relatively long because uplink control information is not fed back in a timely manner can be resolved, so as to reduce a user plane delay. In addition, because uplink control information can be quickly fed back, scheduling can be performed in a system in a timely manner according to the feedback uplink control information, and spectrum efficiency of the system is improved.

When the uplink control information is a HARQ-ACK, because the HARQ-ACK can also be fed back in the subframe used for downlink transmission, a HARQ RTT delay is reduced, and the user plane delay is reduced. In addition, because the HARQ-ACK can be quickly fed back, a scheduling algorithm can be adjusted in the system according to the feedback HARQ-ACK. Therefore, spectrum efficiency is improved.

In addition, in a current TDD system such as a TDD LTE system, in different uplink-downlink configurations, a quantity and locations of uplink subframes are inconsistent with a quantity and locations of downlink subframes. Therefore, each uplink-downlink configuration corresponds to a value of k, that is, timing for feeding back a HARQ-ACK in the current TDD system is not unified. Consequently, implementation complexity and standardization complexity are relatively high.

Therefore, when the uplink control information is the HARQ-ACK, the first subframe may be used to feed back the HARQ-ACK as well as mainly used for downlink transmission, so that different uplink-downlink configurations may be corresponding to same HARQ-ACK timing. A problem that implementation complexity and standardization complexity are relatively high because HARQ-ACK timing in the current TDD system is not unified is resolved.

Further, the first subframe may further include a fourth part. The fourth part is used for downlink transmission or uplink transmission.

The fourth part may be dynamically configured as a symbol used for downlink transmission or a symbol used for uplink transmission, or may be half-statically configured as a symbol used for downlink transmission or a symbol used for uplink transmission. It should be noted that when the first subframe includes the fourth part, and the fourth part is a symbol used for uplink transmission, the third part in the first subframe may be a symbol used for only uplink control information transmission.

The first subframe is introduced to perform short transmission time interval (TTI) data transmission in the first part and/or the fourth part of the first subframe. The short TTI data transmission can reduce a user plane delay. Therefore, a low delay service can be provided by introducing the first subframe. That is, the fourth part may change dynamically, so that a service delay can be reduced without limiting an uplink-downlink configuration. Implementation is more flexible.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the disclosed embodiments and all changes and modifications falling within the scope of the present invention.

Persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A communications apparatus, comprising:
a processor, configured to determine a frame structure of a serving cell, wherein in the determined frame structure of the serving cell, one radio frame comprises at least one first subframe, and the first subframe comprises:
a first part comprising a symbol used for a downlink transmission, wherein the first part is used for a downlink control transmission, and wherein the first part comprises one symbol;
a second part comprising a guard period (GP), wherein a length of the GP is equal to a length of one symbol; and
a third part comprising a symbol used for an uplink transmission, wherein the uplink transmission comprises an uplink control information transmission, wherein the third part is used for one or more of the uplink control information transmission or a sounding reference signal (SRS) transmission, and wherein the third part comprises one symbol; and
a fourth part comprising a symbol used for the downlink transmission or a symbol used for the uplink transmission, wherein the fourth part is used for a downlink data transmission or for an uplink data transmission, and wherein the fourth part comprises eleven symbols; and
a transceiver, configured to send or receive information in the serving cell according to the determined frame structure of the serving cell.

2. The apparatus according to claim 1, wherein the fourth part is located in a tail of the first subframe.

3. The apparatus according to claim 1, wherein:
the first part is further used for the downlink data transmission.

4. The apparatus according to claim 3, wherein:
the third part is located in a tail of the first subframe.

5. The apparatus according to claim 1, wherein the apparatus is a terminal device,
the fourth part is semi-statically configured for the downlink transmission or the uplink transmission; or
the apparatus receives downlink control information;
the apparatus determines, according to the downlink control information, whether the fourth part is used for the downlink transmission or the uplink transmission.

6. The apparatus according to claim 1, wherein the apparatus is an access network device, the access network device sends semi-static configuration information, the semi-static configuration information indicates whether the fourth part is used for the downlink transmission or the uplink transmission; or
the access network device sends the downlink control information, the downlink control information indicates whether the fourth part is used for the downlink transmission or the uplink transmission.

7. A communications method, comprising:
determining, by a communications device, a frame structure of a serving cell, wherein in the determined frame structure of the serving cell, one radio frame comprises at least one first subframe, and the first subframe comprises:
  a first part comprising a symbol used for a downlink transmission, wherein the first part is used for a downlink control transmission, and wherein the first part comprises one symbol;
  a second part comprising a guard period (GP), wherein a length of the GP is equal to a length of one symbol; and
  a third part comprising a symbol used for an uplink transmission, wherein the uplink transmission comprises a uplink control information transmission, wherein the third part is used for one or more of an uplink control information transmission or a sounding reference signal (SRS) transmission, and wherein the third part comprises one symbol; and
  a fourth part comprising a symbol used for the downlink transmission or a symbol used for the uplink transmission, wherein the fourth part is used for a downlink data transmission or for an uplink data transmission, and wherein the fourth part comprises eleven symbols; and
sending or receiving, by the communications device, information in the serving cell according to the determined frame structure of the serving cell.

8. The method according to claim 7, wherein the fourth part is located in a tail of the first subframe.

9. The method according to claim 7, wherein:
the first part is further used for the downlink data transmission.

10. The method according claim 9, wherein the third part is located in a tail of the first subframe.

11. A non-transitory computer readable storage medium, comprising computer program codes which when executed by at least one processor cause a communications device to perform the steps of:
determining a frame structure of a serving cell, wherein in the determined frame structure of the serving cell, one radio frame comprises at least one first subframe, and the first subframe comprises:
  a first part comprising a symbol used for downlink transmission, wherein the first part is used for a downlink control transmission, and wherein the first part comprises one symbol;
  a second part comprising a guard period (GP), wherein a length of the GP is equal to a length of one symbol; and
  a third part comprising a symbol used for an uplink transmission, wherein the uplink transmission comprises an uplink control information transmission, wherein the third part is used for one or more of the uplink control information transmission or a sounding reference signal (SRS) transmission, and wherein the third part comprises one symbol; and
  a fourth part comprising a symbol used for the downlink transmission or a symbol used for the uplink transmission, wherein the fourth part is used for a downlink data transmission or for an uplink data transmission, and wherein the fourth part comprises eleven symbols; and
sending or receiving, by the communications device, information in the serving cell according to the determined frame structure of the serving cell.

12. The non-transitory computer readable storage medium according to claim 11, wherein:
the first part is further used for the downlink data transmission.

13. The non-transitory computer readable storage medium according to claim 12, wherein:
the third part is located in a tail of the first subframe.

* * * * *